US011113712B2

(12) United States Patent
Hoque

(10) Patent No.: US 11,113,712 B2
(45) Date of Patent: Sep. 7, 2021

(54) AUTOMATIC REDEMPTION OF DIGITAL OFFERS WITH DEFERRED PAYMENT

(71) Applicant: Quotient Technology Inc., Mountain View, CA (US)

(72) Inventor: Ehsan Hoque, Pleasanton, CA (US)

(73) Assignee: Quotient Technology Inc., Mountain View, CA (US)

( * ) Notice: Subject to any disclaimer, the term of this patent is extended or adjusted under 35 U.S.C. 154(b) by 137 days.

(21) Appl. No.: 16/254,549

(22) Filed: Jan. 22, 2019

(65) Prior Publication Data

US 2020/0234325 A1 Jul. 23, 2020

(51) Int. Cl.
*G06Q 30/02* (2012.01)
*G06Q 20/40* (2012.01)

(52) U.S. Cl.
CPC ....... *G06Q 30/0234* (2013.01); *G06Q 20/407* (2013.01); *G06Q 30/0226* (2013.01)

(58) Field of Classification Search
CPC ........... G06Q 30/0234; G06Q 30/0226; G06Q 20/407; G06Q 20/3829; G06Q 20/367; G06Q 20/401; G06Q 20/02
See application file for complete search history.

(56) References Cited

U.S. PATENT DOCUMENTS

2007/0162337 A1* 7/2007 Hawkins ............ G06Q 30/0236 705/14.27
2008/0249951 A1* 10/2008 Gilder .................... G06Q 20/04 705/76

(Continued)

OTHER PUBLICATIONS

Han Qui. An inattention model for traveler behavior with e-coupons. Social Science Research Network, pp. 1-36. (Year: 2018).*

*Primary Examiner* — Michael W Schmucker
*Assistant Examiner* — Christopher C Busch
(74) *Attorney, Agent, or Firm* — Baker Botts L.L.P.

(57) ABSTRACT

In an embodiment, a computer-implemented method comprises receiving, at a server computer, offer activation request data, the offer activation request data including a loyalty card number and an identification of a digital offer, the digital offer associated with a discount amount; querying, by the server computer, a digital data repository to seek a data record matching the loyalty card number; in response to determining that the data repository has a record matching the loyalty card number, electronically activating the digital offer associated with the identification of the digital offer and associating the activated digital offer with the loyalty card number in the digital data repository; receiving, at the server computer, contextual transaction data; determining, based on the contextual transaction data, that a consumer entity associated with the loyalty card number purchased a product associated with the activated digital offer; determining, by the server computer, that a post-sale product rebate is available for the consumer entity associated with the loyalty card number and in response thereto, generating, by the server computer, a digital payment file based on the discount amount associated with the activated digital offer; using the server computer, transmitting the digital payment file to a third-party payment system that causes a refund amount to be transmitted electronically to the consumer entity associated with the loyalty card.

11 Claims, 4 Drawing Sheets

(56) References Cited

U.S. PATENT DOCUMENTS

| | | | | |
|---|---|---|---|---|
| 2011/0276378 A1* | 11/2011 | Pointer | G06Q 30/0215 | 705/14.17 |
| 2013/0036001 A1* | 2/2013 | Wegner | G06Q 30/02 | 705/14.31 |
| 2016/0148241 A1* | 5/2016 | Walsh | G06Q 30/0225 | 705/14.26 |
| 2017/0132652 A1* | 5/2017 | Kedzlie | G06Q 30/02 | |
| 2019/0130434 A1* | 5/2019 | Lurie | G06Q 50/06 | |

* cited by examiner

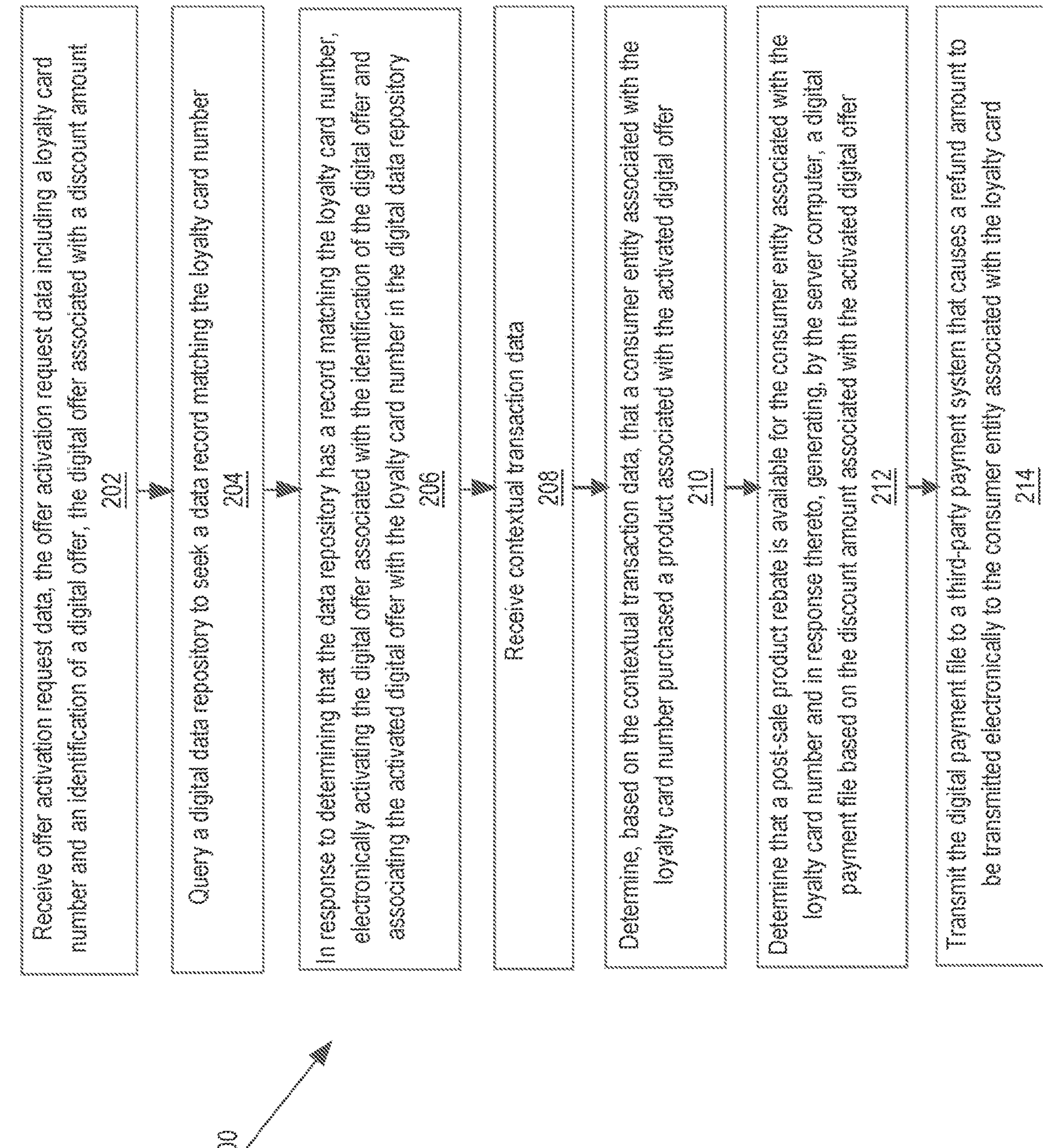
FIG. 2
200
Receive offer activation request data, the offer activation request data including a loyalty card number and an identification of a digital offer, the digital offer associated with a discount amount
202
Query a digital data repository to seek a data record matching the loyalty card number
204
In response to determining that the data repository has a record matching the loyalty card number, electronically activating the digital offer associated with the identification of the digital offer and associating the activated digital offer with the loyalty card number in the digital data repository
206
Receive contextual transaction data
208
Determine, based on the contextual transaction data, that a consumer entity associated with the loyalty card number purchased a product associated with the activated digital offer
210
Determine that a post-sale product rebate is available for the consumer entity associated with the loyalty card number and in response thereto, generating, by the server computer, a digital payment file based on the discount amount associated with the activated digital offer
212
Transmit the digital payment file to a third-party payment system that causes a refund amount to be transmitted electronically to the consumer entity associated with the loyalty card
214

DISPLAY
312
INPUT DEVICE
314
CURSOR CONTROL
316
MAIN MEMORY
306
ROM
308
STORAGE DEVICE
310
BUS
302
PROCESSOR
304
COMMUNICATION INTERFACE
318
300
NETWORK LINK
320
SERVER
330
INTERNET
328
ISP
326
LOCAL NETWORK
322
HOST
324

AUTOMATIC REDEMPTION OF DIGITAL OFFERS WITH DEFERRED PAYMENT

FIELD OF THE DISCLOSURE

The present disclosure is generally related to improvements in the technical field of distribution and redemption of digital offers over distributed computer networks and the internet. The disclosure relates more specifically relates to techniques for automating digital offer redemption and rebates using programmatic algorithms and synchronized connectivity between systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Marketing techniques assist a variety of entities, such as product manufacturers, service providers, and retailers, in efficiently persuading consumers to purchase certain products and service. The emergence of distributed computer networks such as the internet that link consumer computers to service provider computers and retailer computers has introduced new technical problems relating to creating, redeeming, and presenting fraud associated with transmitting electronic documents representing digital coupons, discount offers or other offers via distributed networks.

One common marketing technique involves incentivizing customer behavior through promotional offers. An "offer" may be construed to be a promise by an offer provider, which may be any entity engaged in marketing, to provide a consumer with a benefit under a certain set of implicit or explicit conditions known as terms. Example benefits include, without limitation, a monetary gift, a discount applied to the purchase of one or more products or services, free products and/or services, access to additional offers, and so forth. Example terms may include any one or more of, without limitation, actions that the consumer must perform, a specific set of item(s) that must be purchased by the consumer, a specific amount of money that must be spent by the consumer, a timeframe during which the offer is valid, and so forth. A customer benefit of an offer is realized during a process sometimes called "redemption," which typically takes place during a transaction between the consumer and a retailer. When the consumer wishes to engage in a transaction the retailer determines whether the conditions of the offer have been met. If so, the retailer, which may be any merchant or other entity that sells products or services, provides the benefit to the consumer on behalf of the offer provider.

A particular marketing technique of interest is offering a rebate on a purchased product or service. For a standard mail-in rebate, a customer pays full price for a good or service at the time of purchase. The customer receives a rebate claim form to fill out and mail in. In most cases, the customer needs to send a copy of the receipt of purchase with the rebate claim form. After the manufacturer or provider processes the customer's claim, the customer receives a check or debit card for the rebate amount in the mail. For an online rebate, the customer pays full price for a product or service at the time of purchase and submits a rebate claim later through an online interface. A customer will often be required to upload a picture of the receipt or UPC code. Although various rebate methods provide incentives for customers to purchase, a customer may be disincentivized by the steps and efforts required in order to receive a rebate. The introduction of distributed networks of computers associated with customers, retailers and offer distributors has introduced new problems in the management of these techniques.

Considering the current state of the industry and market for digital offers (including digital coupons and other digital promotional discount vehicles), there is a need for improved systems, methods and technology platforms for enhancing and customizing the digital offer experience of consumers in general, for increasing the value and benefits derived by consumers, and for providing rebates to consumers.

BRIEF DESCRIPTION OF THE DRAWINGS

FIG. 2 illustrates an example algorithm or method for providing automatic redemption of digital offers with deferred payment, according to various embodiments.

DETAILED DESCRIPTION

Figure 1A:
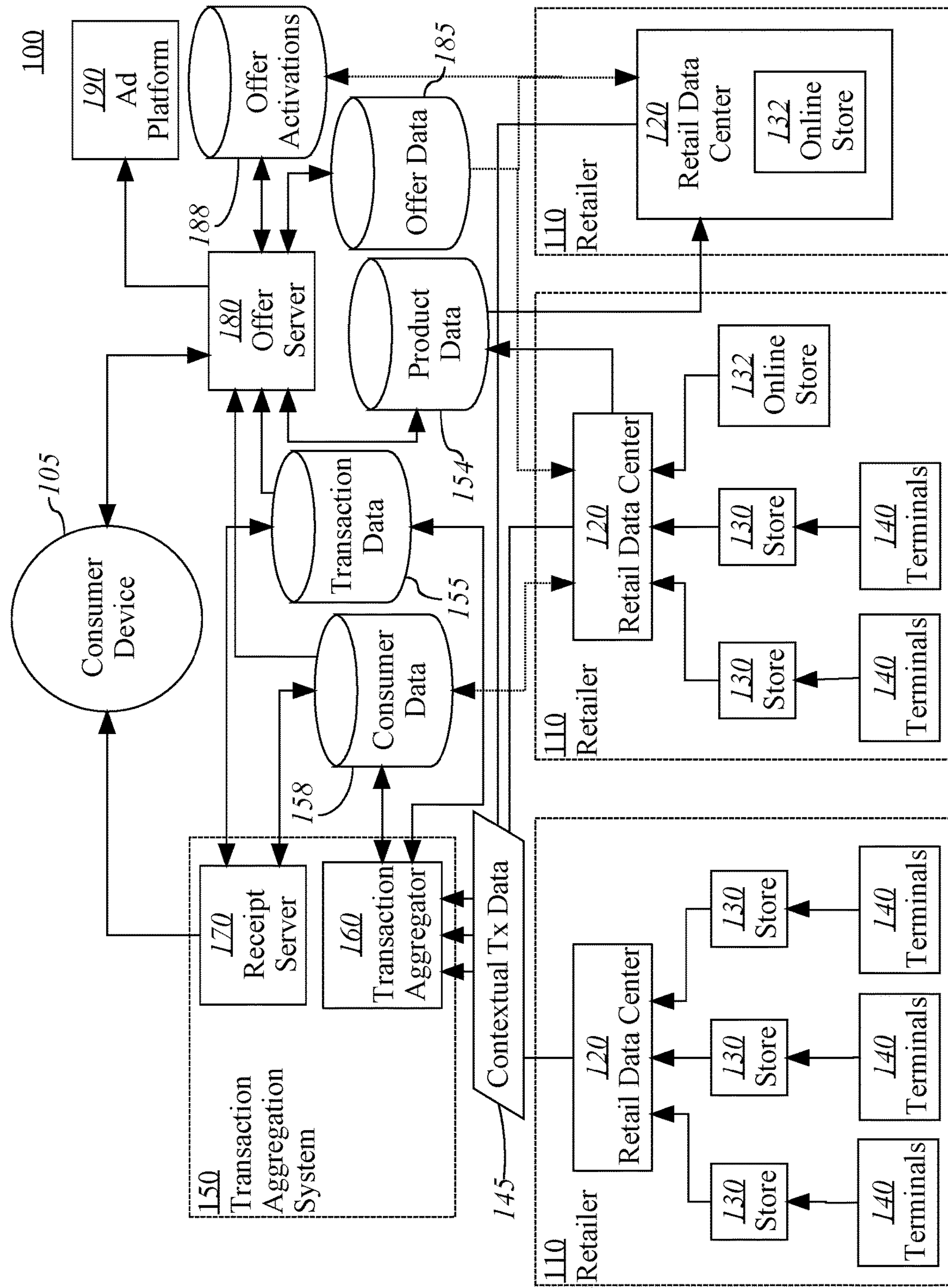
FIG. 1A illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Certain embodiments are described in the content of an application executing on a mobile computing device that works with a server computer. However, it is understood that an application is only executing code which may occur solely or partially on the mobile computing device. For example, the same principles as discussed in this application would be possible using a standalone computer, without access to a server computer.

Embodiments are described in sections according to the following outline:

1.0 GENERAL OVERVIEW
2.0 EXAMPLE NETWORKED COMPUTER SYSTEM
3.0 EXAMPLE ALGORITHMS AND METHODS
4.0 TECHNICAL BENEFITS
5.0 HARDWARE OVERVIEW
6.0 OTHER ASPECTS OF DISCLOSURE 1.0 General Overview Techniques discussed here recite an integrated post-sale rebate system that allows consumers to receive rebates on purchased products and services without conventionally mailing in a rebate or submitting a claim through an online interface.

In an embodiment, a computer-implemented method comprises receiving, at a server computer, offer activation request data, the offer activation request data including a loyalty card number and an identification of a digital offer, the digital offer associated with a discount amount; querying, by the server computer, a digital data repository to seek a data record matching the loyalty card number; in response to determining that the data repository has a record matching the loyalty card number, electronically activating the digital offer associated with the identification of the digital offer and associating the activated digital offer with the loyalty card number in the digital data repository; receiving, at the server computer, contextual transaction data; determining, based on the contextual transaction data, that a consumer entity associated with the loyalty card number purchased a product associated with the activated digital offer; determining, by the server computer, that a post-sale product rebate is available for the consumer entity associated with the loyalty card number and in response thereto, generating, by the server computer, a digital payment file based on the discount amount associated with the activated digital offer; using the server computer, transmitting the digital payment file to a third-party payment system that causes a refund amount to be transmitted electronically to the consumer entity associated with the loyalty card.

The integrated rebate system described herein provides numerous technical advantages. One example is reduced use of memory, CPU cycles, and other computer resources, resulting in improved machine efficiency. With the current approach, networked computers connected to a post-sale rebate system use fewer network messages, buffer memory, CPU cycles and other resources that would otherwise be used to conventionally deliver post-sale rebates to consumers.

Other features, aspects and embodiments will become apparent from the disclosure as a whole including the drawings and claims.

2.0 Example Networked Computer System

FIG. 1A illustrates a computer system 100 for providing automatic redemption of digital offers with deferred payment, according to an embodiment. System 100 may be used in connection with various embodiments of the methods and processes that are described herein.

2.1 Retailers

System 100 is used by multiple retailers 110, each of which operates a different retail data center 120. Each retail data center 120 comprises one or more computing devices and one or more databases that collectively operate as a retail server. Each retail data center 120 is communicatively coupled to one or more brick-and-mortar stores 130 and/or online stores 132 via wired, wireless, or any other type or combination of communication channels, networks or lines.

Each retail data center 120, among other aspects, is programmed to receive transaction data from stores 130 and/or online store 132. The transaction data may be generated by payment terminals 140 at stores 130, or by websites or web-based applications at online stores 132. Payment terminals 140 may be any data processing system or logic module capable of interfacing with a consumer (for example, a person purchasing an item in a grocery store), or with an individual assisting a consumer (for example, a checkout cashier), for the purpose of conducting a transaction, as described herein. For example, payment terminals 140 may be specialized point-of-sale registers or self-checkout stands. Payment terminals 140 may also or instead be add-on devices that interface with existing point-of-sale registers or self-checkout stands.

Each store 130 may further optionally operate a store controller system that interfaces with the various terminals 140. The store controller may be programmed, in concert with retail data center 120, to assist the terminals 140 in conducting transactions, including by providing information about items and offers, as well as by providing payment processing services. These payment processing services may themselves interact with third party payment systems, such as provided by credit card processing services or banks. Such communications may take place via one or more application programming interfaces (APIs), and may use one or more networks or communication channels.

The store controller may collect transaction-related data 145 from the terminals 140 and forward it in real time, near real time, or at a later time to a respective data center 120. This information is sometimes denoted contextual transaction data. In various embodiments, contextual transaction data 145 may include any of a variety of information related to one or more consumer transactions conducted directly or indirectly by a retailer. Examples of contextual transaction data 145 include data originating directly or indirectly from any transaction conducted electronically or physically, over an electronic medium or in a facility owned, controlled or operated by retailer, such as retailer 110, including without limitation basket-level transaction details such as universal product codes (UPCs) and quantities purchased, total number of items purchased, transaction amounts, payment details (for example, a credit card number, a payment identifier, a secure payment hash key), information about a data processing system, logic module or facility where the transaction takes place (for example, terminal 140 or store 130), time, date, offers applied during the transactions, information relating to the customer conducting the transaction (for example, a name, a phone number, a pin number, a password, a code, a loyalty card number, other biometric or personal identification data, etc.), RFID data, a device identifier, items that were purchased in a previous or concurrent transaction, a transaction number, a geolocation, geographic area, or location such as a city, state, county, or municipality where the transaction takes place and any other type or class of similar data.

In one embodiment, the contextual transaction data 145 is received via an application programming interface (API) from a retailer POS or other facility. In one embodiment, the contextual transaction data 145 is received in connection with a request for an offer recommendation. In one embodiment, the contextual transaction data 145 is received independent of a request for an offer recommendation.

2.2 Transaction Aggregation

In one embodiment, each retail data center 120 is also communicatively coupled to a transaction aggregation system 150 via wide area networks and/or direct lines. The retail data centers 120 forward some or all of the contextual transaction data 145 received from their respectively corresponding stores to the transaction aggregation system 150. In various embodiments, contextual transaction data 145 may be transmitted directly or indirectly to any other data processing system, such as a receipt server (for example, receipt server 170), an offer server (for example, offer server 180), an advertisement server or platform (for example, ad platform 190), or other data processing system or platform adapted to process or transmit transaction-related information. The contextual transaction data 145 may be processed at the retail data center 120, or may be unprocessed. The contextual transaction data 145 may be forwarded in real time as it is received, in near-real time, or batched and forwarded at regular intervals.

Transaction aggregation system 150 is a data processing system, which may comprise one or more data processing systems and/or logic modules, and which implements a transaction aggregator 160 and is programmed for processing a variety of transaction data as the data arrives and/or causing such transaction data to be stored in transaction data store 155. Transaction aggregation system 150 may be operated by an offer distributor, a payment provider, a retailer, a third-party service provider, or any other entity that is involved in the process of generating, storing, processing or distributing offers.

In general, the data processed and/or stored by the transaction aggregation system 150 or by another data processing system involved in offer generation, storage, processing or distribution may include transaction attributes that are associated with historical transactions that occurred in the past (sometimes denoted "historical transaction attributes" or "historical transaction records"). Historical transaction records may include various classes of information that relate to users, transactions, vendors, payment processing, and any other aspects of electronic or physical commerce. As an example, historical transaction records may be, or may include contextual transaction data 145 that was generated in connection with previous transactions, has been stored in a memory, may have been further processed and refined, and which can now be retrieved and used as a basis for further data processing and decision making. As another example, historical transaction records may be, or may include transaction data 155, consumer data 158, product data 154, and offer data 185. Historical transaction records may include contextual transaction data 145 or any associated data or derivative data that has been generated up to a current moment in time.

Over one or more network interfaces, transaction aggregator 160 may provide one or more application programming interfaces (APIs). In one embodiment, an API used to receive historical transaction records is denoted a transaction reporting application programming interfaces (APIs). The data centers 120 may use transaction reporting application programming interfaces to report transaction logs, which may include transaction records associated with historical transactions, to transaction aggregator 160. The stored transaction data may comprise transaction logs and other aggregated transaction data from the multiple retailers 110. In some embodiments, transaction aggregation system 150 functions as a coordinating server within the meaning described in other sections.

In various embodiments, the transaction records associated with historical transactions may include transaction data 155, consumer data 158, product data 154, and/or any other types of data relating to historical transactions. These classes of data may be stored in one or more databases, or in the same database, which may be physically stored one or more memories.

Transaction aggregator 160 is programmed to cause various transaction data in transaction data store 155 to be stored in association with consumer entities described by consumer data in consumer data store 158. It will be noted that for simplicity, with respect to customer data store 158 and other data stores described herein, that the same label is used herein to refer to both the data store and the data stored therein. Consumer data store 158 includes records such as consumer records by which transaction data in transaction data store 155 may be matched to specific consumer entities. Examples of such transaction records that relate to consumer records include account identifiers, credit card numbers, names, pin numbers, passwords, personal codes, loyalty card numbers, email addresses, phone numbers, location information, and so forth.

Consumer data store 158 may further include identifying data by which consumer devices 105 may become associated with specific consumer entities, including without limitation IP addresses or other device identifiers, user names, passwords, phone numbers, and location information. Transaction aggregator 160 may further update consumer entity definitions in consumer data store 158 based on the transaction data. Consumer data store 158 and transaction data store 155 may be stored in a same or different database system.

In an embodiment, consumer data store 158 may be periodically seeded with account data collected directly from retailers 110 or other partners, including social media networks and other websites. For example, a retailer 110 may send the transaction aggregation system 150 consumer records based on its loyalty card account program on a weekly basis. In an embodiment, consumer data 158 may also or instead include registration information from consumer interactions with receipt server 170, offer server 180, or a payment system. For example, offer server 180 may feature a registration process during which consumers optionally enter information such as names, loyalty card identifiers, addresses, and so forth. In other embodiments, consumer data 158 merely includes information collected from the transaction data.

Product data store 154 may include information about a plurality of different items, including both goods and services, that may be found in receipts or that may be the subject of an offer. The information may include identifiers such as Universal Product Codes (UPCs) and/or stock-keeping unit (SKU) numbers, taxonomical categorizations, names, descriptions, nutritional information, product specifications, price histories, inventory levels, and/or any other suitable metadata. The product information may be populated and maintained using any suitable data collection technique. For example, the product information may be collected from and/or updated by retailers 110 in periodic batch synchronizations of retailer product databases. As another example, product information may be collected from data mining of retailer or manufacturer websites. The product information may also or instead be updated by transaction aggregation system 150 as part of analyzing transaction data 155. Information from product data store 154 may be utilized to enhance receipts presented by receipt server 170. For example, a line item for a particular UPC in a receipt may include or link to nutritional information or price history comparisons collected in association with that UPC in product data store 154. Similar information may be provided in association with offer recommendations from offer server 180 or advertisements presented by ad platform 190.

In various embodiments, the consumer data 158 and/or product data 154 may or may not be obtained from actual historical transactions in whole or in part (for example, at least part of the consumer data may have been retrieved from a separate commercial or governmental consumer identification database), but could nevertheless be considered to be transaction records associated with historical transactions, or may be used similarly and along with other transaction records associated with historical transactions.

2.3 Receipt Server

Transaction aggregation system 150 further comprises a data processing system or logic module, which may provide various receipt-related functionality, and which is denoted in FIG. 1A as receipt server 170. Receipt server 170 has one or more network interfaces (which may or may not be the same as those that belong to the transaction aggregator 160) over which receipt server 170 may transmit or otherwise make available to consumer devices 105 receipts from one or more of the retailers 110 based on various transaction records associated with historical transactions, including the transaction data in transaction data store 155 and the consumer entity data in consumer data store 158. Receipts may be provided using any of the techniques described herein.

2.4 Offer Server

System 100 further comprises a data processing system or logic module, which may provide various offer-related functionality, and which is denoted in FIG. 1A as offer server 180. Offer server 180 may transmit or otherwise make available offers to consumer devices 105. Offer server 180 may be operated by offer distributor, a payment provider, a retailer, a third-party service provider, or any other entity that is involved in the process of generating, storing, processing or distributing offers. Consumer devices 105 need not necessarily belong to a specific consumer, and may in fact be any device with which a consumer interacts. Consumer devices 105 may include, for instance, desktop computers, laptop computers, ultrabooks, tablets, smartphones, personal wearable data processing systems, virtual reality augmentation devices (for example, wearable glasses with electronic data processing functionality), checkout or other kiosks at retail stores or gas stations, automated teller machines ("ATM"), parking meters, receipt or ticket printers, drive-through menu boards, free-standing interactive displays in public areas or at public events, and so forth.

The act of providing an offer may include providing offer data describing an offer and/or providing a mechanism by which a consumer may redeem the offer, such as a mechanism for printing a coupon, displaying a coupon in a digital format, or saving information identifying the offer to an account associated with the consumer. Offer server 180 may be, for example, one or more computing devices that collectively function as a server. Offer server 180 includes one or more network interfaces (which may be the same as or different from those of transaction aggregation system 150) over which it receives requests for offer(s) from consumer devices 105 and/or other servers. For example, each request may include information provided by a corresponding consumer device 105, such as user login credentials, phone numbers, device identifying information such as an Internet Protocol ("IP") address or Near Field Communication ("NFC") tag, biometric data, basket data, shopping list data, or request metadata, by which the offer server 180 may identify, or guess, a consumer entity for which offer server 180 is to provide an offer. In an embodiment, offer server 180 is a web server that provides offers embedded within web pages, images, or other containers suitable for presentation at a web client. In an embodiment, offer server 180 provides raw offer data in formats or protocols that are not intended to be presented directly by the requestor, such as XML, SOAP, JSON, and so forth. The requestor then processes this raw offer data and generates its own presentation of the offers identified by offer server 180.

Offer server 180 accesses records describing offers within an offer data store 185, including digital metadata associated with each offer, which may have been populated with data from offer providers and/or offer aggregation services. For example, offer server 180 may provide an offer aggregation component that interfaces with or collects data from offer providers describing specific offer campaigns. Offer server 180 compares data from offer data store 185, transaction data store 155, and consumer data store 158 to match one or more offers to specific requests for offers. Depending on where offer server 180 is deployed, offer server 180 may communicate directly with consumer data store 158 and/or transaction data store 155, or offer server 180 may request data via the transaction aggregation system 150. In an embodiment, when providing a consumer with an offer, offer server 180 bases the selection of the offer on transaction data from transactions by the consumer at two or more different more different retailers 110.

Offer server 180 and/or a separate coupon server also generate and access records in an offer activation data store 188. The records in offer activation data store 188 indicate which offers described in offer data store 185 have been "activated" for which consumer entities described in consumer data 158. An "activated" offer for a particular consumer entity is an offer that a consumer entity may be specifically eligible to redeem at one or more of retailers 110. An offer may be activated for a specific set of one or more retailers 110, or for all retailers 110 in general. An activated offer can be mapped directly to a consumer entity in consumer data store 158, or to one or more specific data elements associated with that consumer entity, such as loyalty card identifiers, store account numbers, or household identifiers.

An offer can become activated in response to a number of triggering events, including upon recommendation by the offer recommendation component of offer server 180, upon a consumer device 105 requesting activation of an offer provided by offer server 180, upon a consumer device 105 printing or digitally clipping an offer, in response to a specific request to the offer server 180 from an offer provider or other entity, in response to an automated activation process such as schedule or event-based triggers, and so forth. Since the act of activating an offer often involves a coupon, the acts of "activating a coupon" and "generating a coupon" for a consumer should be understood to refer to or imply the activation of the corresponding offer for that consumer. In fact, in an embodiment, a record describing an activated offer is considered to be equivalent to a digital coupon for that offer. In an embodiment, a record describing an activated offer is used to validate a printed coupon. In an embodiment, a digital coupon is generated on-demand, upon a retailer 110 determining that a transaction involving the corresponding consumer entity record matches the conditions for an offer that has been activated for the consumer entity. In some embodiments, certain offers are "globally activated" for all consumers, in that a consumer may redeem the offer without the offer having been specifically activated for the consumer entity.

In an embodiment, offer server 180 and receipt server 170 are in fact the same server. In other embodiments offer server 180 and receipt server 170 are separate and distinct servers, and may even be operated by different providers. In an embodiment, multiple different offer servers 180 may make use of the transaction data in transaction data store 155.

In an embodiment, the data in offer data store 185 and/or offer activation data store 188 is accessible by or shared with retail data centers 120 or other components of retailers 110. For example, offer server 180 may provide or may use an API by which stores 130 may request offer data for offers identified by consumers in real-time. As another example, offer server 180 may periodically send offer data describing available offers to retail data centers 120, which in turn may synchronize the offer data with their own local repositories of offer data. The retailers 110 may further be provided with offer activation data from offer activation data 188, either on demand or in periodic batches, to assist the retailers 110 in determining whether a particular consumer is eligible for particular offers. Retailers 110 may further remove activated offers from offer activation data store 188 upon a consumer redeeming an activated offer. The removal may be accomplished by a direct communication with offer server 180, offer data store 185, or other suitable component, or indirectly as a result of providing transaction data to transaction aggregation system 150. In an embodiment, activated offers are not deleted from offer activation data 188, but rather simply marked as redeemed for tracking and other purposes. In other embodiments, offer tracking data is stored separately from offer activation data.

Ad platform 190 is a set of one or more data processing systems or logic components that deliver ads to consumers via, for instance, websites or mobile applications. Offer server 180 may be part of ad platform 190, or may be entirely separate from offer server 180. Offer server 180 and ad platform 190 may be operated by the same entity, or by different providers.

In various embodiments, one or more data processing systems or logic modules may be adapted to generate, select, modify, store, process and/or distribute receipts and/or offers to consumers and/or retailers based on various transaction records associated with historical transactions.

For example, with reference to the embodiment of FIG. 1A, the receipt server 170 may generate, select, modify, store, process and/or distribute receipts based on consumer data 158, transaction data 155, and product data 154. Such receipts may also include offer information that is produced based on offer data 185. Further, the generation, storage, modification, selection, processing and/or distribution of such receipts may also be based on offer data 185 (for example, depending on which offers are available, the content, availably, manner of distribution or other aspects of the receipt may be adjusted). As another example, with reference to the embodiment of FIG. 1A, the offer server 180 may generate, select, modify, store, process and/or distribute offers based on consumer data 158, transaction data 155, product data 154, and offer data 185.

Offer server 180 may further have access to a number of data sources for various uses. One example of such a data source is the optional product data store 154. Other examples of such data sources may include, without limitation, an offer tracking data store, a shopping list data store comprising shopping list data collected from shopping list applications on consumer devices 105, a web history data store, an event log data store as described in other sections, a location history data store, a weather data store, and so forth.

In various embodiments, one or more data processing systems or logic modules, such as offer server 180, receipt server 170 or ad platform 190, may be adapted to generate, select, modify, store, process and/or distribute receipts and/or offers to consumers and/or retailers based on both (a) contextual transaction data 145 and (b) historical transaction records.

Figure 1B:
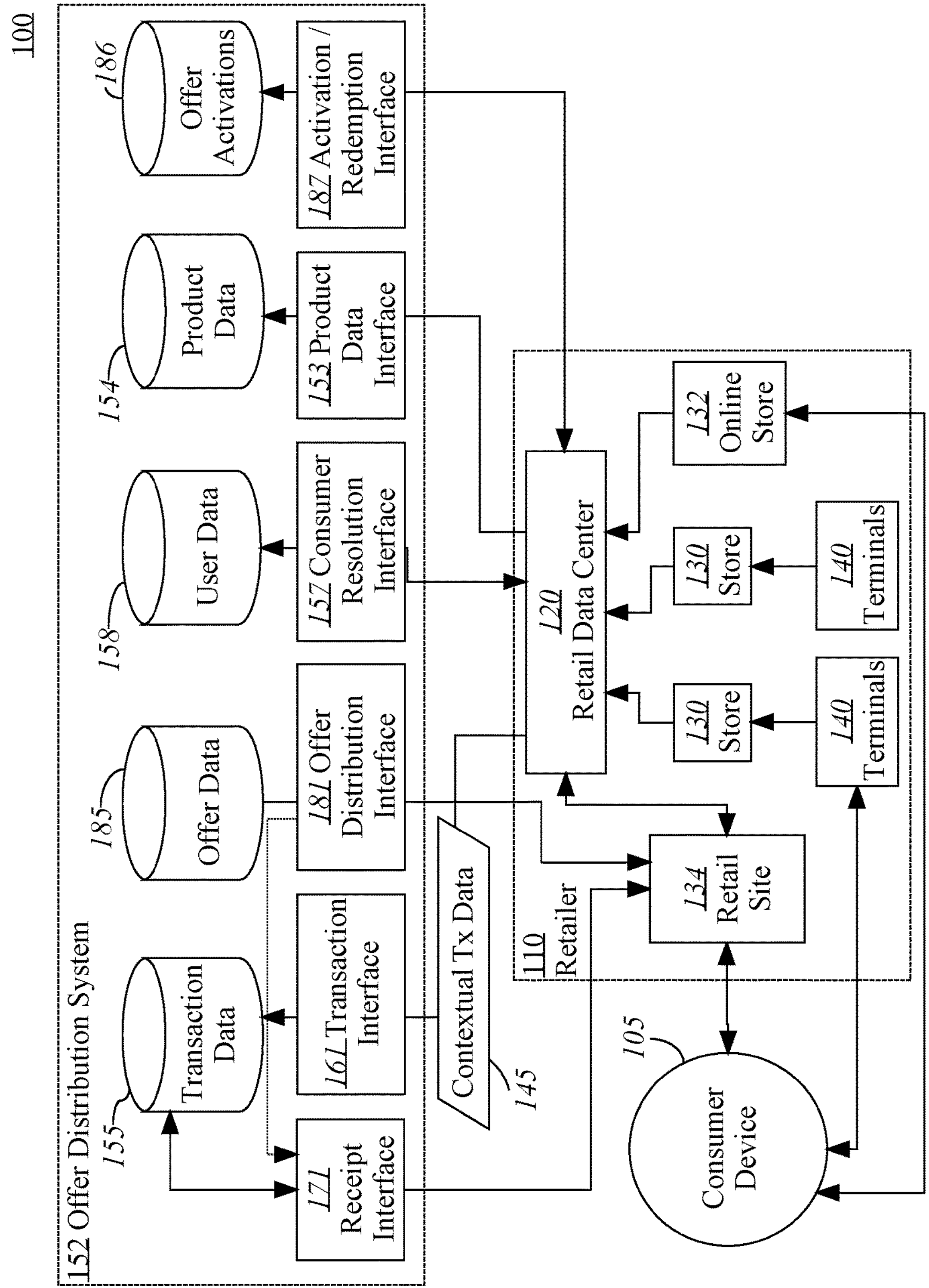
FIG. 1B illustrates a different view of the example networked computer system in which various embodiments may be practiced.

FIG. 1B is a different view of system 100 for providing automatic redemption of digital offers with deferred payment, according to an embodiment.

As depicted in FIG. 1B, a retailer 110 features retail data center 120, stores 130, online store 132, and terminals 140. Retailer 110 further implements a retailer site 134. Retailer site 134 is a web site operated by the retailer, potentially in association with online store 132, for distributing offers. Retailer 110 may utilize site 134 to distribute offers from offer distribution system 152. Optionally, retailer 110 may distribute offers from other sources utilizing site 134. Retailer 110 may further utilize site 134 to distribute receipts stored in transaction data 155. The receipts distributed at site 134 may or may not include embedded offers from offer data 185. Retailer 110 may rely upon offer distribution system 152 to provide code and/or templates for presenting offers, or site 134 may arrange its own presentations of offers and/or receipts.

Consumers interact with the retailer 110 for various purposes at site 134, terminals 140, or online store 132. The interactions may involve a consumer device 105 that functions, among other purposes, as an endpoint for receiving offers. Or, the consumers may interact directly with terminals 140, or personnel operating terminals 140.

As depicted in FIG. 1B, system 100 comprises an offer distribution system 152. The offer distribution system 152 is a set of one or more server computing devices and data repositories that implement the depicted components. For example, the offer distribution system may further comprise offer server 180 and receipt server 170 illustrated in the embodiment of FIG. 1A. The server computer devices may be co-located in a single data center, or the components may be distributed across multiple locations. In either case, the offer distribution system 152 may be operated under the control of an offer distributor that is different from a retailer 110 or provider 195. Offer distribution system 152 comprises, among other elements, transaction data 155, offer data 185, user data 158, product data 154, and offer activation data 186.

Retailer 110 uses various interfaces of offer distribution system 152 to distribute offers and receipts, upload transaction data, and redeem activated offers. These interfaces include a receipt interface 171 to receipt server 170, a transaction interface 161 to transaction data 155, an offer distribution interface 181 to offer data 185, a consumer resolution interface 157 to user data 158, a product data interface 153 to product data 154, and an activation/redemption interface 187 to activation data 186. The interfaces may comprise any suitable combination of APIs, ports, protocol handlers, server-side logic, and network components.

The retailer 110 accesses the interfaces of offer distribution system 152 over a network for various interactions between retailer 110 and components such as offer server 180, receipt server 170, and transaction aggregator 160. For example, retail data center 120 and/or other components of retailer 110 may utilize consumer resolution interface 157 to upload consumer data collections, resolve the identity of a consumer that is operating a consumer device 105 or transacting with a terminal 140, and/or request data associated with a consumer entity. Retail data center 120 may further upload product data for offer distribution systems 152's records through product data interface 153. Retail data center 120 may further upload transaction data through transaction interface 161. Retail data center 120 may communicate through offer distribution interface 181 to learn offer terms. Retail data center 120 may communicate through activation/redemption interface 187 to identify offers for which a consumer is eligible and/or to report redeemed offers. Retail site 134 or other components of retail data center 120 may communicate via receipt interface 171 and offer distribution interface 181 to obtain receipts and offers respectively. Offer distribution system 152 may feature yet other interfaces for other purposes. Other example interactions are described through this application.

Again, system 100 is but one example of system for practicing the techniques described herein. Other systems may include additional or fewer elements in potentially varying arrangements. For example, the offer distribution system 152 may not necessarily comprise components of transaction aggregation system 150. As another example, some or all of the retailers 110 may not necessarily utilize the same architecture as depicted in FIG. 1B. For instance, some retailers 110 may lack a retail site 134 or online store 132, while others may lack terminals 140. As another example, the offer distribution system 152 need not provide each and every interface depicted in FIG. 1B. Moreover, in some embodiments, FIGS. 1A and 1B are actually views of different systems. Also, the logical division of functions between the interfaces described above need not be exactly the same as depicted.

2.5 Variations

System 100 is just one example system for providing automatic redemption of digital offers with deferred payment. Other systems may involve fewer, additional, and/or different elements in potentially varying arrangements. For example, other systems may involve many more retailers 110 having many more stores 130 and/or additional online stores 132. Additional consumers 105 may access offer server 180 and/or receipt server 170 with additional devices. As another example, in an embodiment, payment terminals 140 are configured to communicate directly with transaction aggregator 160 over a wide area network. For instance, payment terminals 140 may be specialized terminals deployed by, and potentially even subsidized by, the operator of transaction aggregation system 150. In an embodiment, some or all retailers 110 may not have a retail data center 120. Rather, individual stores 130 and/or 132 communicate directly with transaction aggregation system 150.

In an embodiment, offer server 180 communicates with retailer data centers 120 to recommend offers that retailers 110 may make available to certain consumers. For example, retailers 110 may deploy informational kiosks throughout a store with which consumers may interact. Retailers 110 may send information collected from consumers by these kiosks to offer server 180, which in turn may then provide offer data describing one or more recommended offers to the kiosk. The offer data may then be displayed at the kiosk. Similarly, recommended offer data may be returned to a store clerk or other employee based on information that the consumer has provided. The employee may then recommend an offer to the consumer. Such a technique could be used for a variety of purposes—for example, offers may be recommended at a checkout stand to encourage additional purchases, or an offer may be suggested by a salesperson to "close" a deal on an item that the consumer appears hesitant to purchase. Similar techniques may also be used to recommend offers on a store website.

[63] In an embodiment, retailers 110 or another entity, such as a payment system, may include a website that delivers receipts and/or offers to consumer devices 105. For example, the website may include a receipt generation application that retrieves receipt data from receipt server 170 via a suitable API, and then formats the receipt data to fit a retailer-specific template. Similarly, the website may include an offer provision application that requests offer data for certain consumers from offer server 180, and then reformats those offers to be embedded within a retailer's website. Offers from offer server 180 may co-exist within such a website along with offers from other sources, including retailer-specific offers that are not distributed by offer server 180. In an embodiment, similar levels of customization may be achieved by a retailer or other entity providing receipt server 170 or offer server 180 with template data that instructs the receipt server 170 or offer server 180 how to present receipts and offers that are specific to that entity.

3.0 Method Overview

FIG. 2 is a flowchart of an example method for providing automatic redemption of digital offers with deferred payment, according to various embodiments.

For purposes of illustrating a clear example, FIG. 2 is described herein in the context of FIG. 1A and FIG. 1B, but the broad principles of FIG. 2 can be applied to other systems having configurations other than as shown in FIG. 1A and FIG. 1B. Further, FIG. 2 and each other flow diagram herein illustrates an algorithm or plan that may be used as a basis for programming one or more of the functional modules of FIG. 1A and FIG. 1B that relate to the functions that are illustrated in the diagram, using a programming development environment or programming language that is deemed suitable for the task. Thus, FIG. 2 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In step 202, offer activation request data is received at a server computer, the offer activation request data including a loyalty card number and an identification of a digital offer, the digital offer associated with a discount amount. For example, a consumer entity may login to a web portal associated with a retailer 110 where various digital offers are listed. The login information of the consumer entity may be associated with a loyalty card number of the consumer entity. Once logged in, the consumer entity may then select, i.e. click, a digital offer to request to activate the digital offer.

In step 204, the server computer queries a digital data repository to seek a data record matching the loyalty card number. For example, after receiving the loyalty card number with the offer activation request data in step 202, the offer server queries a digital data repository such as consumer datastore 158 for a match of the loyalty card number.

In step 206, in response to determining that the data repository has a record matching the loyalty card number, electronically activating the digital offer associated with the identification of the digital offer and associating the activated digital offer with the loyalty card number in the digital data repository. For example, by receiving the results of the query from step 204, the offer server 180 determines that the consumer datastore 158 includes a matching loyalty card number. In response, the offer server 180 activates the digital offer associated with the identification of the digital offer from step 202 and saves the activation data in association with the loyalty card number in the offer activation datastore 188.

In step 208, the server computer receives contextual transaction data. For example, the offer server 180 receives contextual transaction data in response to a transaction being executed at a terminal 140 or online store 132.

In an embodiment, contextual transaction data comprises at least one or more of a universal product code, a quantity of product purchased, a number of items purchased, a transaction amount, at least a portion of a credit card number that was used, a payment identifier that identifies a form of payment that was used, a secure payment hash key, an identifier of a data processing system, an identifier of a merchant or retailer facility, a time or date when a transaction took place a geolocation, geographic area, or location such as a city, state, county, or municipality where a transaction took place, one or more offers that were activated or redeemed, a customer name, a customer identification, an item identification, an item category information, a phone number, a personal identifier number (PIN), a loyalty card number, a device identifier, or a transaction number.

In an embodiment, contextual transaction data is stored locally in association with a retailer 110 or online store 132 before being transmitted to the offer server 180. For example, for a transaction at a retailer 110 where milk is purchased, the contextual transaction data associated with the purchase of milk is stored at retail data center 120 or in a data center associated with a store 130 where the milk was purchased. The contextual transaction data may be stored locally at a retail data center 120 or store 130 for a threshold amount of time or until a threshold amount of transactions are recorded. The contextual transaction data for a plurality of transactions may then be aggregated into a single file and transmitted to the offer server 180 in a batch.

In step 210, it is determined that a consumer entity associated with the loyalty card number purchased a product associated with the activated digital offer based on the contextual transaction data. For example, after receiving the contextual transaction data in step 208, the offer server 180 submits a query to a digital data repository such as consumer datastore 158, transaction datastore 155, product datastore 154, offer activations 188 to determine whether specific criteria is met. The query may include a UPC and a loyalty card number from the contextual transaction data received in step 208. The UPC and loyalty card number from the contextual transactions data may be submitted with the query to determine if the UPC and loyalty card number from the contextual transaction data matches a UPC and loyalty card number associated with an activated digital offer.

As an example, if a consumer with loyalty card number: '999' purchases milk with UPC: '100', the server computer submits a query to the offer activations datastore 188 to determine that the offer activations datastore 188 stores a record for loyalty card number: '999' that is associated with an activated digital offer for UPC: '100'.

In step 212, it is determined that a post-sale product rebate is available for the consumer entity associated with the loyalty card number and in response thereto, generating, by the server computer, a digital payment file based on the discount amount associated with the activated digital offer. For example, offer server 180 determines that a post-sale product rebate is available based on digital metadata associated with the digital offer. Based on this determination, a digital payment file is generated based on a discount amount included in the digital metadata associated with the digital offer.

In an embodiment, digital metadata associated with the digital offer includes information specifying post-sale product rebate availability and a discount amount. Digital metadata for a digital offer may be stored collectively in a digital data repository such as offer datastore 185 with the digital offer, or, in some embodiments, stored in a file separate from the digital offer.

In an embodiment, post-sale product rebate availability may be specified by digital metadata associated with the digital offer. The digital metadata may also specify certain criteria that must be satisfied for the post-sale product rebate to be available to a consumer entity associated with the loyalty card number. For example, the digital metadata associated with the digital offer may indicate that a post-sale product rebate is available for the digital offer. As a more specific example, the digital metadata associated with the digital offer may indicate that a post-sale product rebate is available for the digital offer during a specified time frame. To satisfy this criterion, the server computer must determine that the activated digital offer was not expired at the time the product associated with the digital offer was purchased by programmatically comparing a time or date when a transaction took place from the contextual transaction data to a time or date constraint specified in the digital metadata criteria.

[78] Additionally, the digital metadata associated with the digital offer may indicate that a post-sale product rebate is available for the digital offer for certain geographic locations. As an example, the digital metadata may indicate that a post-sale product rebate is available in the geographic regions corresponding to the states of California, Oregon, and New Mexico. To satisfy this criterion, the server computer may programmatically compare a geolocation or location where a transaction took place from the contextual transaction data to a list of permitted geolocations or locations specified in the digital metadata criteria. The comparison may be executed by comparing strings, such as comparing "California" from the digital metadata to "California" from the contextual transaction data, or by normalizing the data to a numerical format and then executing the comparison, as discussed below.

For example, if the digital metadata specifies "San Francisco" as an available city for the post-sale product rebate but the contextual transaction data specifies geographical coordinates as 37° N and 122° W, the offer server 180 invokes a mapping function that converts the specified geographic region to a range of region geographic coordinate values that represent the specified geographic region. The offer server 180 may invoke a third-party application programming interface (API) via the network 180 to convert the specified geographic region or may also do the conversion on the offer server 180. For example, for a city named "San Francisco", the offer server 180 will convert "San Francisco" into a range of geographic coordinate values, such as [85-90]° and [0-5]°. The geographic coordinate values are compared to the range of geographic coordinate values that represent the specified geographic region to determine if the geographic coordinate values from the contextual transaction data fall within the range of converted geographic coordinate values of the specified geographic region from the digital metadata. If the latitude-longitude values from contextual transaction data fall within the converted range of geographic coordinate values from the digital metadata, it is determined that a post-sale product rebate is available to the consumer entity associated with the loyalty card number.

In an embodiment, a digital payment file is generated based on the discount amount associated with the activated digital offer. The digital payment file may be saved in an XML document or file, a Comma Separated Values (CSV) file, or any other type of file. The discount amount may be specified in digital metadata associated with the digital offer, as discussed above. A digital payment file may be generated that specifies a refund amount that is based on the discount amount that is to be delivered to the consumer entity associated with the loyalty card number that purchased a product associated with the activated digital offer. For example, a particular consumer entity associated with a particular loyalty card number activates a digital offer with a discount amount specifying "$25 off your purchase". If the product or service associated with the activated digital offer is $100 retail price, upon determining that the product or service was purchased by the particular consumer and that a post-sale product rebate is available for the particular consumer, an entry to the digital payment file is generated to include a refund amount of $25.

In step 214, the digital payment file is transmitted to a third-party payment system that causes a refund amount to be transmitted electronically to the consumer entity associated with the loyalty card. For example, the offer server 180 transmits the digital payment file to a third-party payment system via API. Third-party payment systems such as PAYPAL or VENMO distribute the refund amount(s) to the consumer entities specified in the digital payment file using appropriate methods.

In an embodiment, a digital payment file is generated based on a plurality of discount amounts, each discount amount associated with an activated digital offer of a plurality of activated digital offers. The digital payment file may be stored locally in a cache associated with the offer server 180 or in a digital data repository accessible over a network before being transmitted to the offer server 180. The digital payment file may be stored for a threshold amount of time or until a threshold amount of payments are recorded in the payment file. Multiple payments may then be delivered in a single payment file, transmitted to the third-party payment system and caused the refunds amounts specified in the payment file to be released in a batch.

4.0 Technical Benefits

Techniques discussed here recite an integrated rebate system that allows consumers to receive refunds on purchased products and services without conventionally mailing in a rebate or submitting proof of purchase through an online interface. Using the foregoing techniques, programmed computers may use a distributed system to transfer, store, monitor, and apply a set of rules to process rebates using contextual transaction data and post-sale rebate criteria to automatically determine rebate eligibility and deliver refunds. Previous approaches involved conventional systems associated with receiving the rebate from a consumer, manually inputting the rebate into a system, processing the rebate, printing letters and postage in addition to storing data relating to the consumers and rebates, resulting in excessive and wasteful use of processing resources such as CPU cycles, memory, and network bandwidth. However, the present approach uses integrated system logic in association with rebate criteria to reduce the duplication of efforts and decrease the use of computer resources, thus improving overall computing system efficiency.

These techniques promote efficiency in the use of data processing resources and a reduction in use of resources. For example, an entity is not required to deploy a separate computer program application just for the purpose of delivering refund check or debit card to users. Further, a consumer is not required to actively submit rebates via mail or online terminal. Instead, contextual transaction data is already recorded in the system and by linking this data to offer activation data associated with post-sale rebate criteria, a rebate can be offered post-sale with minimal consumer and offer provider interaction. Additionally, fewer network messages are needed and less memory is needed to handle processes associated with verifying product purchases and generating and mailing checks to consumers that otherwise would be required to deliver a refund to a consumer who file a claim for a rebate. Thus, the efficiency, efficacy, and utility of the data can be maximized in this unique application.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
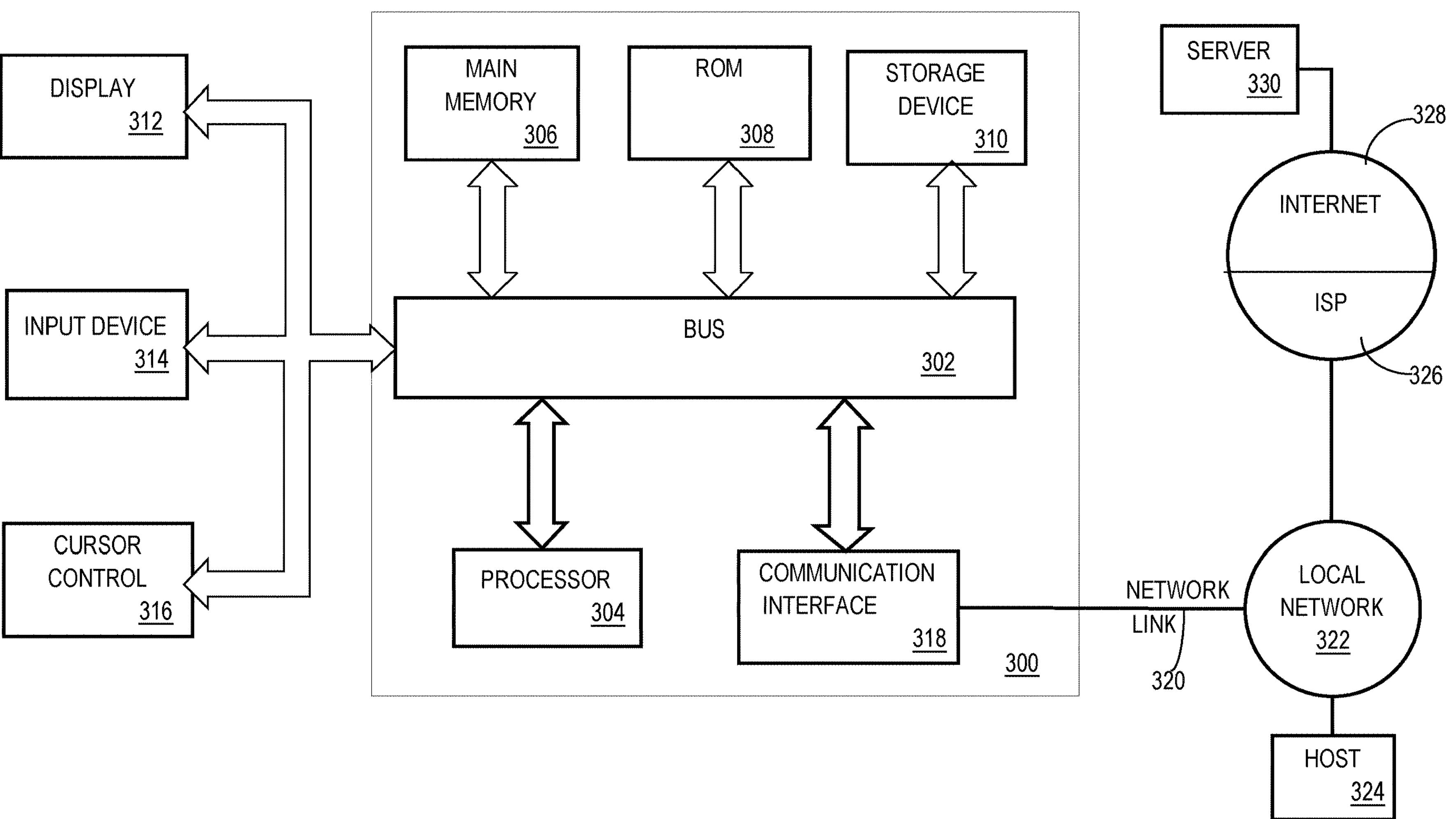
FIG. 3 illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (for example, x) and a second axis (for example, y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method for improving computer processing efficiency using a distributed system to transfer, store, monitor, and apply a set of rules to process rebates using contextual transaction data and post-sale rebate criteria to automatically determine rebate eligibility and deliver refunds, the method comprising:

receiving, at a server computer that is used by multiple retailers, each of which operates a different retail data center comprising one or more computing devices and one or more databases that collectively operate as a retail server, each retail data center being communicatively coupled to one or more brick-and-mortar stores and/or online stores, and independent of a request for an offer recommendation, contextual transaction data via an application programming interface (API) from a retailer terminal in real time with respect to a transaction at the terminal, the contextual transaction data comprising at least basket-level transaction details comprising universal product codes (UPCs) and quantities purchased;

receiving, at the server computer from a transaction aggregator via APIs of the transaction aggregators, the contextual transaction data comprising historical transaction records that were generated for previous transactions with the multiple retailers;

receiving, at a product data store that is communicatively coupled to the server computer, Universal Product Codes (UPCs) and/or stock-keeping unit (SKU) numbers and descriptions of products from the multiple retailers in periodic batch synchronizations of retailer product databases and from the historical transaction records;

receiving, at the server computer, offer activation request data, the offer activation request data including a loyalty card number and an identification of a digital offer, the digital offer associated with a discount amount, the digital offer being associated with digital metadata specifying one or more post-sale product rebate availability criteria comprising that a post-sale product rebate is available for the digital offer during a specified time frame and/or for certain geographic locations;

querying, by the server computer, a digital data repository to seek a data record matching the loyalty card number;

in response to determining that the data repository has a record matching the loyalty card number, electronically activating the digital offer associated with the identification of the digital offer and associating the activated digital offer with the loyalty card number in the digital data repository;

determining, based on the contextual transaction data and based on querying the product data store, that a consumer entity associated with the loyalty card number purchased a product associated with the activated digital offer and identified in the product data store;

determining, by the server computer, that a post-sale product rebate is available for the consumer entity associated with the loyalty card number based on the digital metadata and the post-sale product rebate availability criteria, the post-sale rebate being a rebate that is available for the consumer entity after the consumer entity has purchased the product associated with the activated digital offer;

in response to determining that the post-sale product rebate is available for the consumer entity after the purchase of the product, generating, by the server computer, a digital payment file based on the discount amount associated with the activated digital offer, the digital payment file specifying a refund amount to be electronically transmitted to the consumer entity associated with the loyalty card, the refund amount resulting after the purchase of the product associated with the activated digital offer; and using the server computer, transmitting the digital payment file to a third-party payment system that causes the refund amount specified in the digital payment file and resulting after the purchase of the particular product to be transmitted electronically to the consumer entity associated with the loyalty card, the refund amount being transmitted automatically to the consumer entity without an explicit input from the consumer entity to avail the post-sale product rebate.

2. The method of claim 1, wherein the contextual transaction data further comprises at least one or more of a transaction amount, at least a portion of a credit card number that was used, a payment identifier that identifies a form of payment that was used, a secure payment hash key, an identifier of a data processing system, an identifier of a merchant or retailer facility, a time or date when a transaction took place a geolocation, geographic area, or location such as a city, state, county, or municipality where a transaction took place, one or more offers that were activated or redeemed, a customer name, a customer identification, an item identification, an item category information, a phone number, a personal identifier number (PIN), a loyalty card number, a device identifier, or a transaction number.

3. The method of claim 1, wherein the refund amount is based on the discount amount associated with the activated digital offer.

4. The method of claim 1, further comprising receiving, from the third-party payment system, an indication that the refund amount was successfully delivered to the consumer entity associated with the loyalty card.

5. One or more non-transitory computer-readable media storing instructions which, when processed by one or more processors of a server computer as part of a distributed system to transfer, store, monitor, and apply a set of rules to process rebates using contextual transaction data and post-sale rebate criteria to automatically determine rebate eligibility and deliver refunds cause:

receiving, at the server computer that is used by multiple retailers, each of which operates a different retail data center comprising one or more computing devices and one or more databases that collectively operate as a retail server, each retail data center being communicatively coupled to one or more brick-and-mortar stores and/or online stores, and independent of a request for an offer recommendation, contextual transaction data via an application programming interface (API) from a retailer terminal in real time with respect to a transaction at the terminal, the contextual transaction data comprising at least basket-level transaction details comprising universal product codes (UPCs) and quantities purchased;

receiving, at the server computer from a transaction aggregator via APIs of the transaction aggregators, the contextual transaction data comprising historical transaction records that were generated for previous transactions with the multiple retailers;

receiving, at a product data store that is communicatively coupled to the server computer, Universal Product Codes (UPCs) and/or stock-keeping unit (SKU) numbers and descriptions of products from the multiple retailers in periodic batch synchronizations of retailer product databases and from the historical transaction records;

receiving, at the server computer, offer activation request data, the offer activation request data including a loyalty card number and an identification of a digital offer, the digital offer associated with a discount amount, the digital offer being associated with digital metadata specifying one or more post-sale product rebate availability criteria comprising that a post-sale product rebate is available for the digital offer during a specified time frame and/or for certain geographic locations;

querying, by the server computer, a digital data repository to seek a data record matching the loyalty card number;

in response to determining that the data repository has a record matching the loyalty card number, electronically activating the digital offer associated with the identification of the digital offer and associating the activated digital offer with the loyalty card number in the digital data repository;

determining, based on the contextual transaction data and based on querying the product data store, that a consumer entity associated with the loyalty card number purchased a product associated with the activated digital offer and identified in the product data store;

determining, by the server computer, that a post-sale product rebate is available for the consumer entity associated with the loyalty card number based on the digital metadata and the post-sale product rebate availability criteria, the post-sale rebate being a rebate that is available for the consumer entity after the consumer entity has purchased the product associated with the activated digital offer;

in response to determining that the post-sale product rebate is available for the consumer entity after the purchase of the product, generating, by the server computer, a digital payment file based on the discount amount associated with the activated digital offer, the digital payment file specifying a refund amount to be electronically transmitted to the consumer entity associated with the loyalty card, the refund amount resulting after the purchase of the product associated with the activated digital offer; and using the server computer, transmitting the digital payment file to a third-party payment system that causes the refund amount specified in the digital payment file and resulting after the purchase of the particular product to be transmitted electronically to the consumer entity associated with the loyalty card, the refund amount is transmitted automatically to the consumer entity without an explicit input from the consumer entity to avail the post-sale product rebate.

6. The one or more non-transitory computer-readable media of claim 5, wherein the contextual transaction data comprises at least one or more of a transaction amount, at least a portion of a credit card number that was used, a payment identifier that identifies a form of payment that was used, a secure payment hash key, an identifier of a data processing system, an identifier of a merchant or retailer facility, a time or date when a transaction took place a geolocation, geographic area, or location such as a city, state, county, or municipality where a transaction took place, one or more offers that were activated or redeemed, a customer name, a customer identification, an item identification, an item category information, a phone number, a personal identifier number (PIN), a loyalty card number, a device identifier, or a transaction number.

7. The one or more non-transitory computer-readable media of claim 5, wherein the refund amount is based on the discount amount associated with the activated digital offer.

8. The one or more non-transitory computer-readable media of claim 5, further comprising receiving, from the third-party payment system, an indication that the refund amount was successfully delivered to the consumer entity associated with the loyalty card.

9. A computer system of a distributed system to transfer, store, monitor, and apply a set of rules to process rebates using contextual transaction data and post-sale rebate criteria to automatically determine rebate eligibility and deliver refunds, the system comprising:

one or more processors; and one or more memories communicatively coupled to the one or more processors and storing instructions which, when processed by the one or more processors of a server computing device, cause:

receiving, at a server computer that is used by multiple retailers, each of which operates a different retail data center comprising one or more computing devices and one or more databases that collectively operate as a retail server, each retail data center being communicatively coupled to one or more brick-and-mortar stores and/or online stores, and independent of a request for an offer recommendation, contextual transaction data via an application programming interface (API) from a retailer terminal in real time with respect to a transaction at the terminal, the contextual transaction data comprising at least basket-level transaction details comprising universal product codes (UPCs) and quantities purchased;

receiving, at the server computer from a transaction aggregator via APIs of the transaction aggregators, the contextual transaction data comprising historical transaction records that were generated for previous transactions with the multiple retailers;

receiving, at a product data store that is communicatively coupled to the server computer, Universal Product Codes (UPCs) and/or stock-keeping unit (SKU) numbers and descriptions of products from the multiple retailers in periodic batch synchronizations of retailer product databases and from the historical transaction records;

receiving, at the server computer, offer activation request data, the offer activation request data including a loyalty card number and an identification of a digital offer, the digital offer associated with a discount amount, the digital offer being associated with digital metadata specifying one or more post-sale product rebate availability criteria comprising that a post-sale product rebate is available for the digital offer during a specified time frame and/or for certain geographic locations;

querying, by the server computer, a digital data repository to seek a data record matching the loyalty card number;

in response to determining that the data repository has a record matching the loyalty card number, electronically activating the digital offer associated with the identification of the digital offer and associating the activated digital offer with the loyalty card number in the digital data repository;

determining, based on the contextual transaction data and based on querying the product data store, that a consumer entity associated with the loyalty card number purchased a product associated with the activated digital offer and identified in the product data store;

determining, by the server computer, that a post-sale product rebate is available for the consumer entity associated with the loyalty card number based on the digital metadata and the post-sale product rebate availability criteria, the post-sale rebate being a rebate that is available for the consumer entity after the consumer entity has purchased the product associated with the activated digital offer;

in response to determining that the post-sale product rebate is available for the consumer entity after the purchase of the product, generating, by the server computer, a digital payment file based on the discount amount associated with the activated digital offer, the digital payment file specifying a refund amount to be electronically transmitted to the consumer entity associated with the loyalty card, the refund amount resulting after the purchase of the product associated with the activated digital offer; and using the server computer, transmitting the digital payment file to a third-party payment system that causes the refund amount specified in the digital payment file and resulting after the purchase of the particular product to be transmitted electronically to the consumer entity associated with the loyalty card, the refund amount being transmitted automatically to the consumer entity without an explicit input from the consumer entity to avail the post-sale product rebate.

10. The computer system of claim 9, wherein the contextual transaction data comprises at least one or more of a transaction amount, at least a portion of a credit card number that was used, a payment identifier that identifies a form of payment that was used, a secure payment hash key, an identifier of a data processing system, an identifier of a merchant or retailer facility, a time or date when a transaction took place a geolocation, geographic area, or location such as a city, state, county, or municipality where a transaction took place, one or more offers that were activated or redeemed, a customer name, a customer identification, an item identification, an item category information, a phone number, a personal identifier number (PIN), a loyalty card number, a device identifier, or a transaction number.

11. The computer system of claim 9, wherein the refund amount is based on the discount amount associated with the activated digital offer.

* * * * *